US010678051B2

(12) United States Patent
Nakayama et al.

(10) Patent No.: US 10,678,051 B2
(45) Date of Patent: Jun. 9, 2020

(54) HEAD-UP DISPLAY DEVICE

(71) Applicant: Panasonic Intellectual Property Management Co., Ltd., Osaka (JP)

(72) Inventors: Kenji Nakayama, Osaka (JP); Kosuke Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 107 days.

(21) Appl. No.: 16/170,017

(22) Filed: Oct. 24, 2018

(65) Prior Publication Data
US 2019/0064521 A1 Feb. 28, 2019

Related U.S. Application Data

(63) Continuation of application No. PCT/JP2017/019650, filed on May 26, 2017.

(30) Foreign Application Priority Data

May 31, 2016 (JP) .................................. 2016-108979
Apr. 25, 2017 (JP) .................................. 2017-086122

(51) Int. Cl.
*G02B 27/01* (2006.01)
(52) U.S. Cl.
CPC ..... *G02B 27/0149* (2013.01); *G02B 27/0172* (2013.01); *G02B 2027/0156* (2013.01); *G02B 2027/0181* (2013.01)
(58) Field of Classification Search
CPC ............ G02B 27/0149; G02B 27/0172; G02B 27/01; G02B 7/18; G02B 7/182; G02B 2027/0154; B60K 35/00
(Continued)

(56) References Cited

U.S. PATENT DOCUMENTS

| 5,028,119 A | * | 7/1991 | Hegg ................. G02B 27/0018 340/980 |
| 5,394,203 A | * | 2/1995 | Murphy ................. G02B 27/01 353/13 |

(Continued)

FOREIGN PATENT DOCUMENTS

JP           5020252 B      9/2012

OTHER PUBLICATIONS

International Search Report of PCT application No. PCT/JP2017/019650 dated Aug. 15, 2017.

*Primary Examiner* — James R Greece
(74) *Attorney, Agent, or Firm* — Greenblum & Bernstein, P.L.C.

(57) ABSTRACT

In a head-up display device, in accordance with lifting and lowering operations of a combiner, each protrusion of a combiner support moves along a guide portion, causing a cover-operation member to turn about a rotary axis in a direction in which a cover is opened or closed. The guide portion includes, from top in order: a first guide portion which engages with the protrusion in a first state (use state); a second guide portion which engages with the protrusion when the cover-operation member turns; and a third guide portion which engages with the protrusion in a second state (non-use state). The angle formed by the direction in which the first guide portion extends and the direction in which the third guide portion extends is less than the angle formed by the direction in which the first guide portion extends and the direction in which the second guide portion extends.

6 Claims, 13 Drawing Sheets

(58) Field of Classification Search
USPC .......................................................... 359/630
See application file for complete search history.

(56) References Cited

U.S. PATENT DOCUMENTS 5,677,701 A * 10/1997 Okuyama .............. B60K 37/02
345/7
2008/0285138 A1 11/2008 Lebreton

* cited by examiner

HEAD-UP DISPLAY DEVICE

CROSS-REFERENCE TO RELATED APPLICATIONS

This application is a continuation of the PCT International Application No. PCT/JP2017/019650 filed on May 26, 2017, which claims the benefit of foreign priority of Japanese patent applications No. 2016-108979 and No. 2017-086122 filed on May 31, 2016 and Apr. 25, 2017, respectively, the contents all of which are incorporated herein by reference.

BACKGROUND

1. Technical Field

The present disclosure relates to a head-up display device.

2. Description of the Related Art

Conventionally, head-up displays (HUDs) are known each which is mounted in a vehicle such as an automobile. For example, an HUD is known which displays information on a combiner to assist the driver. The combiner is disposed in front of the driver in a raised state. However, when the driver is not using the combiner, for example, the raised combiner is in the frontal field of view of the driver, which hinders driving.

In order to overcome such a problem, an HUD device is disclosed which uses a storage device for storing the combiner in an instrumental panel (also referred to as a dashboard) when the combiner is not used (see Japanese Patent No. 5020252). In some HUD devices, the optical path and the combiner are hidden with a cover when the combiner is stored, in order to improve the design quality.

SUMMARY

The present disclosure provides an HUD device which has a configuration for maintaining the closed state of the cover without an electromagnetic force.

The HUD device according to one aspect of the present disclosure includes a housing, a cover, a combiner, a combiner support, a lifting support, and a pair of cover-operation members. The housing has an opening on a top of the housing. The cover is accommodated in the housing and opens the opening of the housing in a first state. Moreover, the cover closes the opening of the housing in a second state. The combiner comes out from the opening of the housing in the first state. Moreover, the combiner is accommodated in the housing in the second state. The combiner support supports the combiner. The lifting support supports the combiner support so that the combiner support can be lifted and lowered. The pair of cover-operation members is disposed on opposite sides of the combiner support, and opens and closes the cover in accordance with lifting and lowering operations of the combiner. The combiner support includes a pair of protrusions disposed on the opposite sides of the combiner support. Each of the pair of cover-operation members includes a guide portion which extends vertically. The pair of protrusions moves along the guide portions of the combiner support, respectively, in accordance with the lifting operation of the combiner, causing the pair of cover-operation members to turn about a rotary axis in a direction in which the cover is opened, and the pair of protrusions moves along the guide portions, respectively, in accordance with the lowering operation of the combiner, causing the pair of cover-operation members to turn about the rotary axis in a direction in which the cover is closed. Each of the guide portions includes, from top in order, a first guide portion, a second guide portion, and a third guide portion. The first guide portion extends, in the first state, along a first direction parallel to lifting and lowering directions in which the combiner is lifted and lowered. The first guide portion engages with one of the pair of protrusions in the first state. The second guide portion is connected to the first guide portion, and extends along a second direction different from the first direction. The second guide portion engages with the one of the pair of protrusions when the pair of cover-operation members turns. The third guide portion is connected to the second guide portion, and extends along a third direction different from the second direction. The third guide portion engages with the one of the pair of protrusions in the second state. The angle formed by the first direction and the third direction is less than the angle formed by the first direction and the second direction.

According to the present disclosure, it is possible to provide an HUD device which has a configuration for maintaining the closed state of the cover without an electromagnetic force.

DETAILED DESCRIPTION OF PREFERRED EMBODIMENTS

Prior to description of an embodiment of the present disclosure, problems in conventional HUD devices will be briefly described. For hiding the optical path and the combiner with the cover when the combiner is stored, a configuration is known in which the cover covers the opening of the housing by bringing an edge of the cover into contact with the edge of the housing around the opening from below. In this configuration, the edge of the cover which is covering the opening and is in a closed state, and the edge of the housing around the opening are in contact with each other.

Since the HUD device is disposed in an instrumental panel, the movement of the vehicle may move an object, such as a coin and an accessory, placed on the instrumental panel, to the top of the cover. In this case, if the contact state between the edge of the cover and the housing is released by the weight of the object which has moved to the top of the cover which is in the closed state, the object falls down through the gap between the housing and the cover. Moreover, during the assembly or installation of the HUD device at a factory, or during cleaning or the like of the vehicle, the cover is inadvertently opened by an application of force to the cover.

In order to solve the problems, it is known to hold the cover with an electromagnetic force by applying a constant current to the motor which drives the cover so as to maintain the closed state of the cover. However, due to holding the cover with the electromagnetic force, power is consumed even when the HUD device is not used.

An embodiment of the present disclosure will be described below with reference to the drawings.

Figure 1:
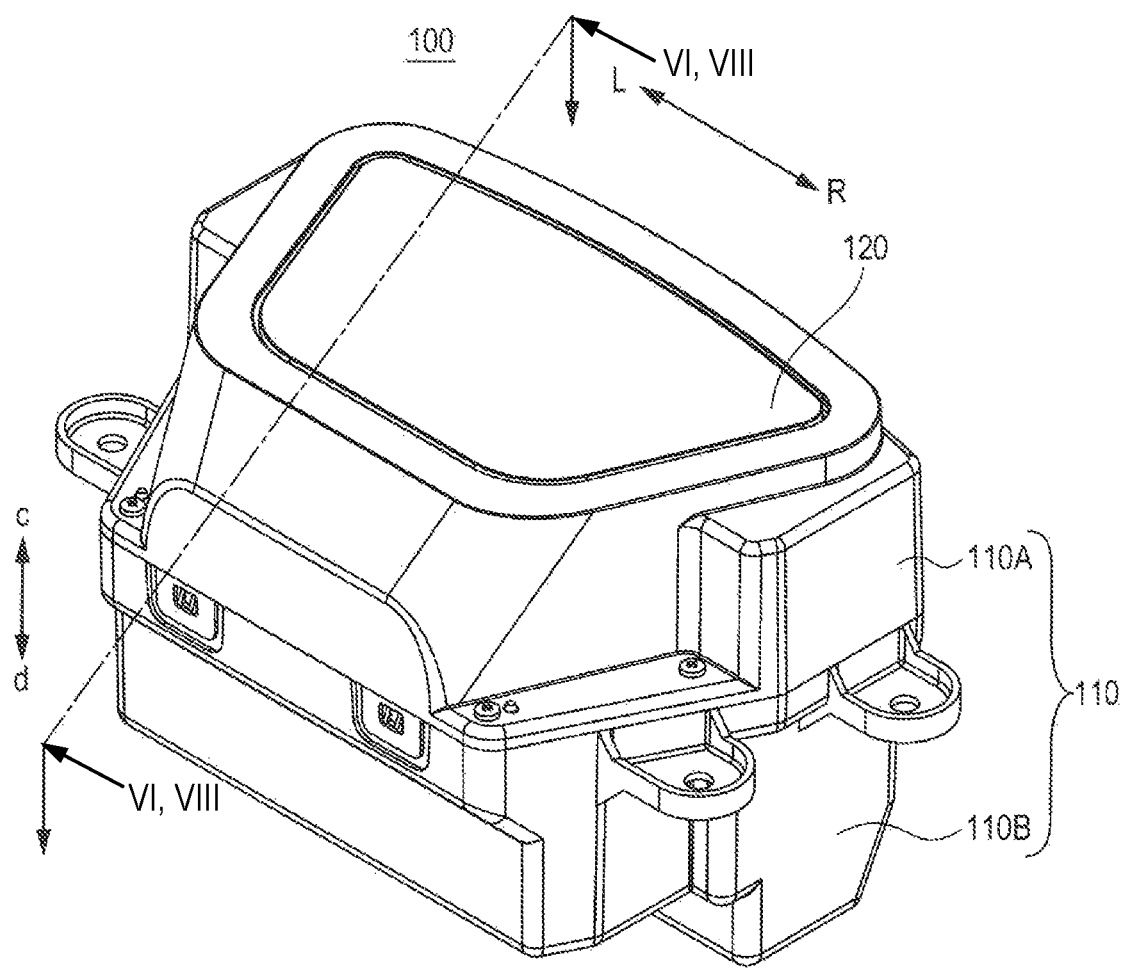
FIG. 1 is a perspective view of an appearance of an HUD device according to an embodiment of the present disclosure when a cover of the HUD device is in a closed state.
Figure 2:
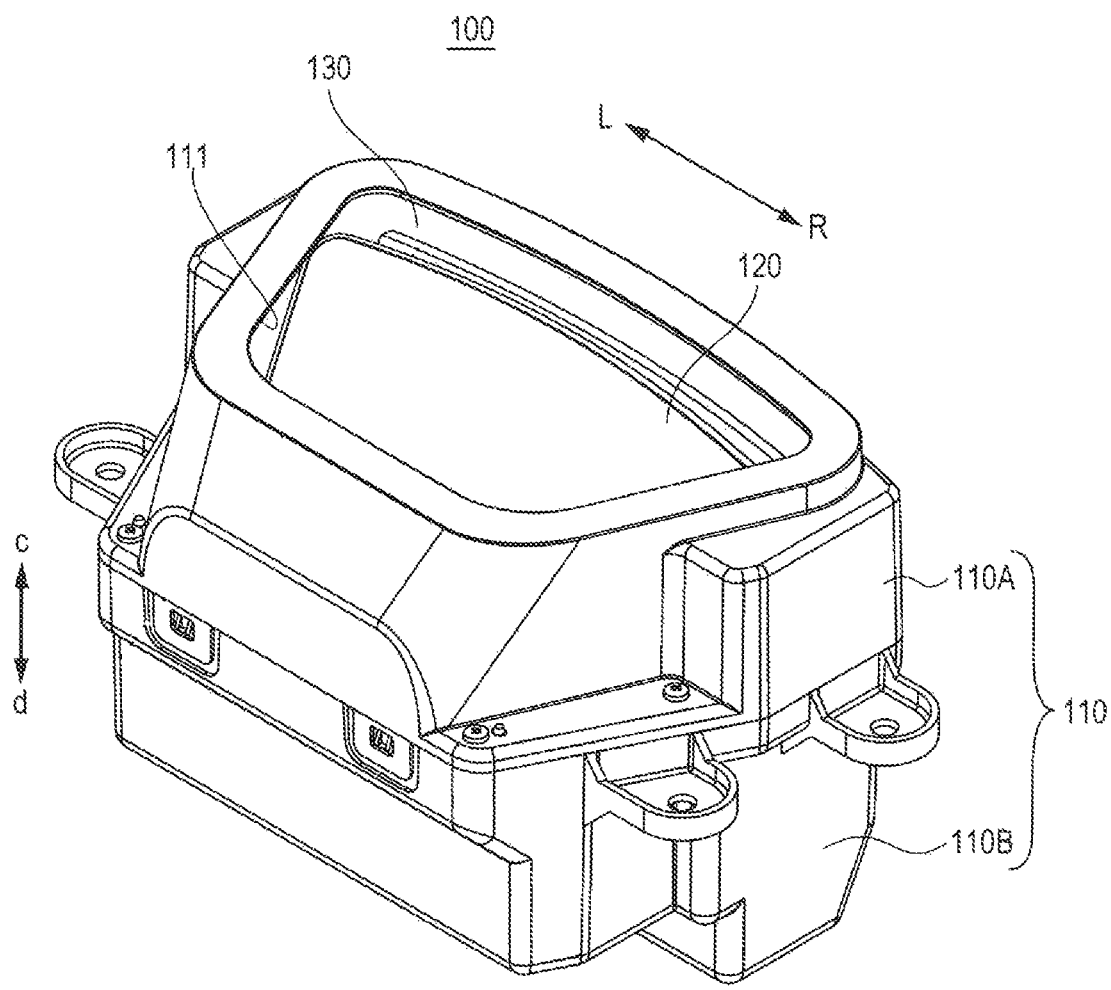
FIG. 2 is a perspective view of an appearance of the HUD device illustrated in FIG. 1 when the cover is in an opened state.
Figure 3:
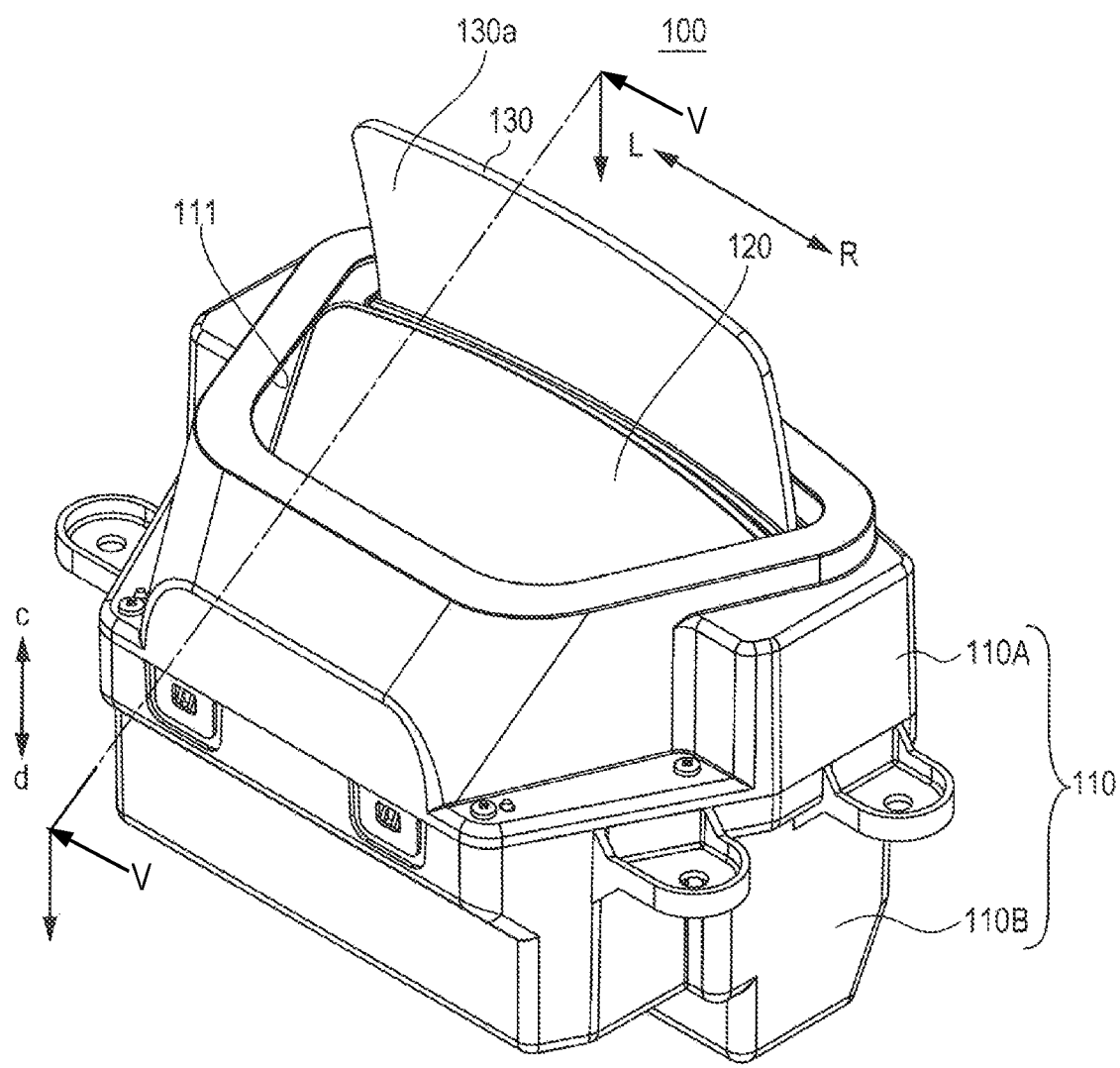
FIG. 3 is a perspective view of an appearance of the HUD device illustrated in FIG. 1 when a combiner of the HUD device is in a raised state.
Figure 4:
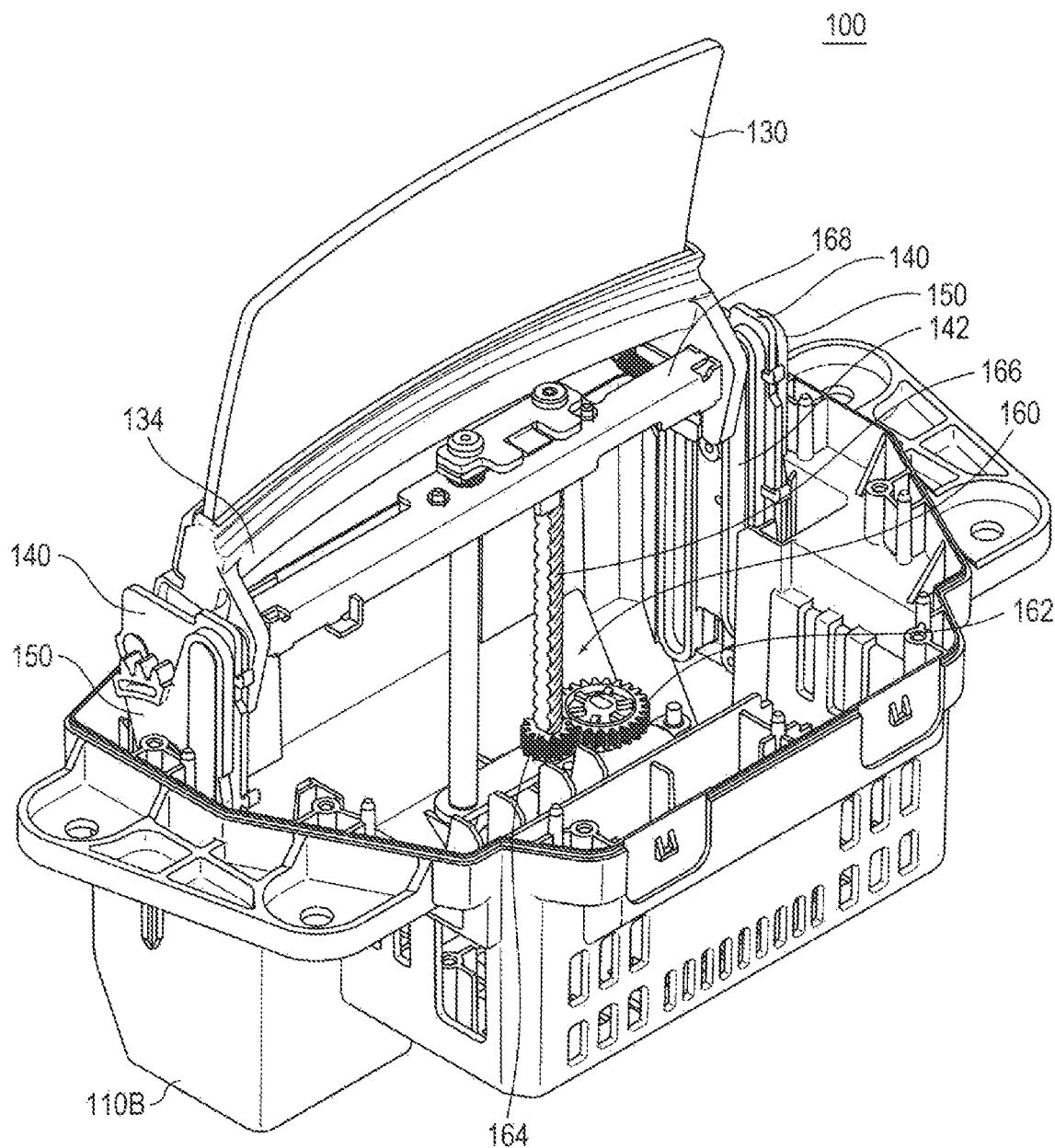
FIG. 4 is a perspective view of an appearance of the HUD device illustrated in FIG. 3 when the cover is removed.

First, with reference to FIG. 1 to FIG. 4, a configuration of head-up display (HUD) device 100 according to an embodiment will be described. FIG. 1 is a perspective view of an appearance of HUD device 100 when cover 120 of HUD device 100 is in a closed state. FIG. 2 is a perspective view of an appearance of HUD device 100 when cover 120 is in an opened state. FIG. 3 is a perspective view of an appearance of HUD device 100 when combiner 130 of HUD device 100 is in a raised state. FIG. 4 is a perspective view of an appearance of HUD device 100 illustrated in FIG. 3 when cover 120 and upper housing 110A which forms the upper portion of housing 110 are removed.

As illustrated in FIG. 1 to FIG. 4, HUD device 100 includes housing 110, cover 120, combiner 130, lifting supports 140, cover-operation members 150, and combiner driver 160. HUD device 100 is disposed in, for example, an instrumental panel (also referred to as a dashboard) of a vehicle.

Housing 110 includes upper housing 110A and lower housing 110B. Housing 110 accommodates combiner 130, combiner driver 160, and cover-operation members 150. Moreover, housing 110 accommodates a projection device (not illustrated) in housing 110, in the rear of housing 110 closest to the back of the vehicle. Upper housing 110A is provided with opening 111 on its top face.

Cover 120 is disposed so as to cover opening 111 of housing 110. Cover 120 performs open and close operations in conjunction with the lifting and lowering operations of combiner 130. Note that the details of the opening operation of cover 120 will be described later.

Combiner 130 is, for example, a half mirror, and is made of a plate glass and an optically semi-transmissive film of, for example, tin or silver that is vapor-deposited on one surface of the plate glass. Combiner 130 is semi-transmissive, thus allowing the user to see the front of the vehicle through combiner 130.

The lifting and lowering operations of combiner 130 made by combiner driver 160 causes combiner 130 to be in a stored state or a raised state. For example, the user can switch the state of combiner 130 between the stored state and the raised state by performing an operation for instructing driving of the electric motor (not illustrated) of combiner driver 160. Here, the stored state refers to a state in which combiner 130 is stored in housing 110 of HUD device 100. The raised state refers to a state where combiner 130 is raised, that is, combiner 130 has been lifted and has come out from opening 111 of housing 110. In a first state where HUD device 100 is used, combiner 130 is in the raised state, and in a second state where HUD device 100 is not used, combiner 130 is in the stored state.

On projection surface 130a of combiner 130 illustrated in FIG. 3, an image is projected from the projection device (not illustrated) accommodated in housing 110 when combiner 130 is in the raised state. Accordingly, the user sees the image projected on combiner 130, overlapped with the forward field of view of the vehicle. For example, the image indicates the vehicle speed, the remaining amount of fuel, the distance to the destination, the traveling direction, the name of the current location, or the names of facilities and shops that are near the current location.

In the stored state where combiner 130 is stored as illustrated in FIG. 1, the part of HUD 100 below cover 120 is embedded into the instrumental panel. In this case, it is preferable that the top surface of cover 120 and the surface of the instrumental panel are approximately horizontal. Accordingly, HUD device 100 does not block the field of view of the driver when combiner 130 is in the stored state.

Combiner driver 160 is accommodated in housing 110, in the front of housing 110 closest to the front of the vehicle. Combiner driver 160 lifts and lowers combiner 130 by using the power of the electric motor in response to an operation of the user (driver or passenger).

Combiner driver 160 includes motor gear 162, feed screw 166, movable member 168, and combiner support 134. Motor gear 162 is coupled to the electric motor (not illustrated), and is rotated by driving of the electric motor. Feed screw 166 includes gear 164 that meshes with motor gear 162. Feed screw 166 is coupled to motor gear 162 via gear 164, and rotates in accordance with the rotation of motor gear 162. Accordingly, movable member 168 that is threadedly engaged with feed screw 166 moves upward and downward along feed screw 166. Feed screw 166 and movable member 168 configure a feed mechanism for moving movable member 168 in upward and downward directions of housing 110 by the rotation of feed screw 166. Note that the upward direction of housing 110 refers to the direction indicated by arrow "c" in FIG. 1 to FIG. 3 and FIGS. 5 and 6, and the downward direction of housing 110 refers to the direction indicated by arrow "d" in FIG. 1 to FIG. 3 and FIGS. 5 and 6.

Combiner support 134 is connected to movable member 168 and support combiner 130. The upward power of movable member 168 generated by the feed mechanism is conveyed to combiner support 134, and lifts combiner 130. The downward power of movable member 168 generated by the feed mechanism is conveyed to combiner support 134, and lowers combiner 130.

Figure 12:
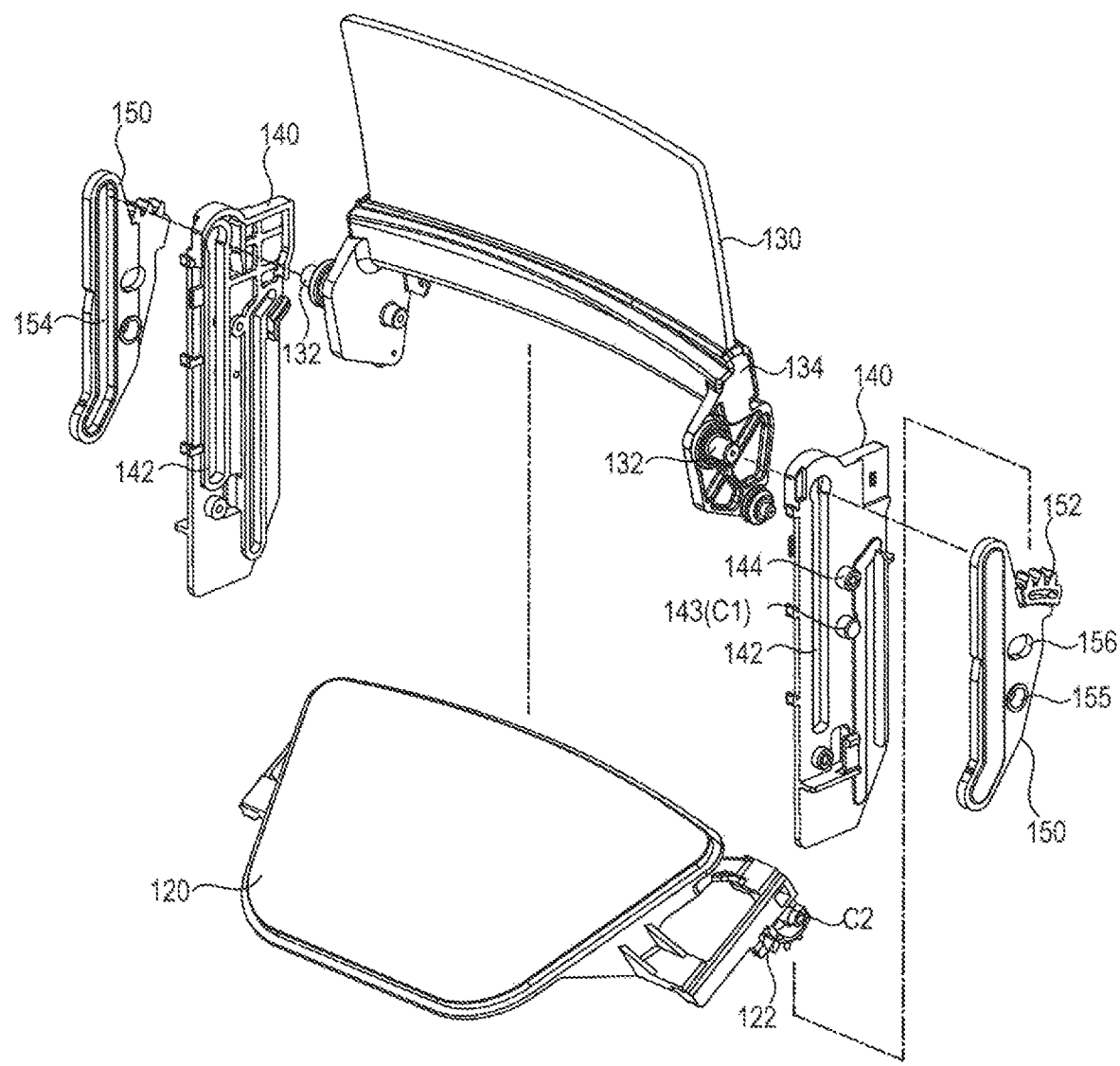
FIG. 12 is an exploded perspective view of the main parts of the HUD device illustrated in FIG. 1.

Lifting supports 140 are plate-shaped members disposed on the left and right sides of combiner 130, respectively. As illustrated in FIG. 12 to be described later, combiner support 134 includes a pair of protrusions 132 on both sides thereof. Each of lifting supports 140 is provided with slit 142 in the region corresponding to the movement region of protrusion 132 of combiner support 134 (see FIG. 5).

Slit 142 is linearly formed along the upward and downward directions of housing 110 (or the direction indicated by arrow "c" or arrow "d", that is, the lifting direction or the lowering direction of combiner 130). Slit 142 is the region where protrusion 132 of combiner support 134 slides when combiner 130 switches between the stored state and the raised state.

Protrusion 132 is disposed on combiner support 134 on the side closer to lifting support 140 (that is on the outer surface of combiner support 134). Protrusion 132 (see FIG. 5) is inserted into slit 142, penetrates slit 142, and engages with guide portion 154 to be described later (see FIG. 5 and FIG. 7).

An example of the configuration of HUD device 100 has been described above.

Next, the details of an operation of HUD device 100 will be described. A description will be given below of an operation when combiner 130 switches from the stored state to the raised state or from the raised state to the stored state.

[Lifting and Lowering Operations of Combiner 130]

Figure 5:
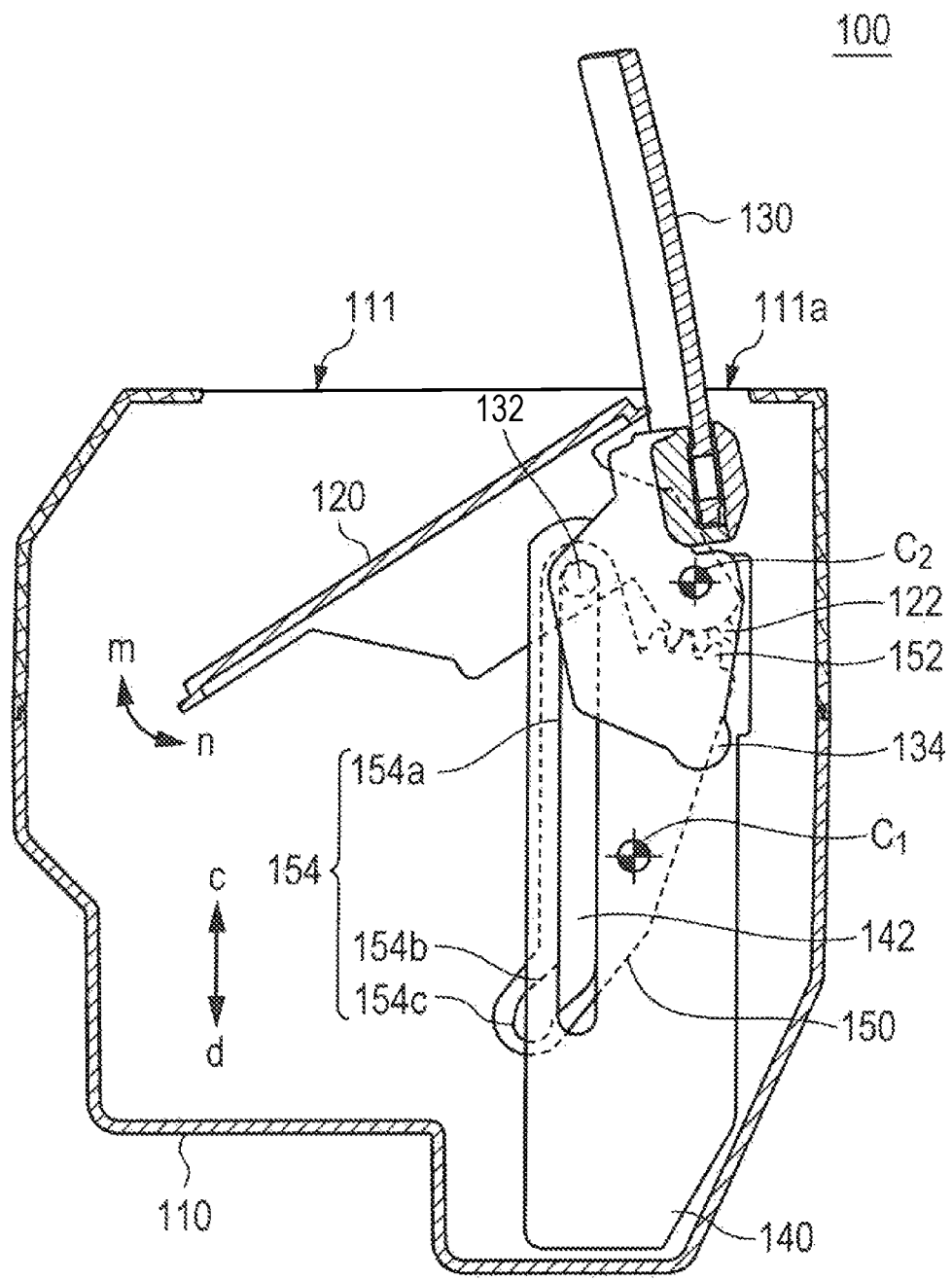
FIG. 5 is a cross-sectional view taken along line V-V in FIG. 3.
Figure 6:
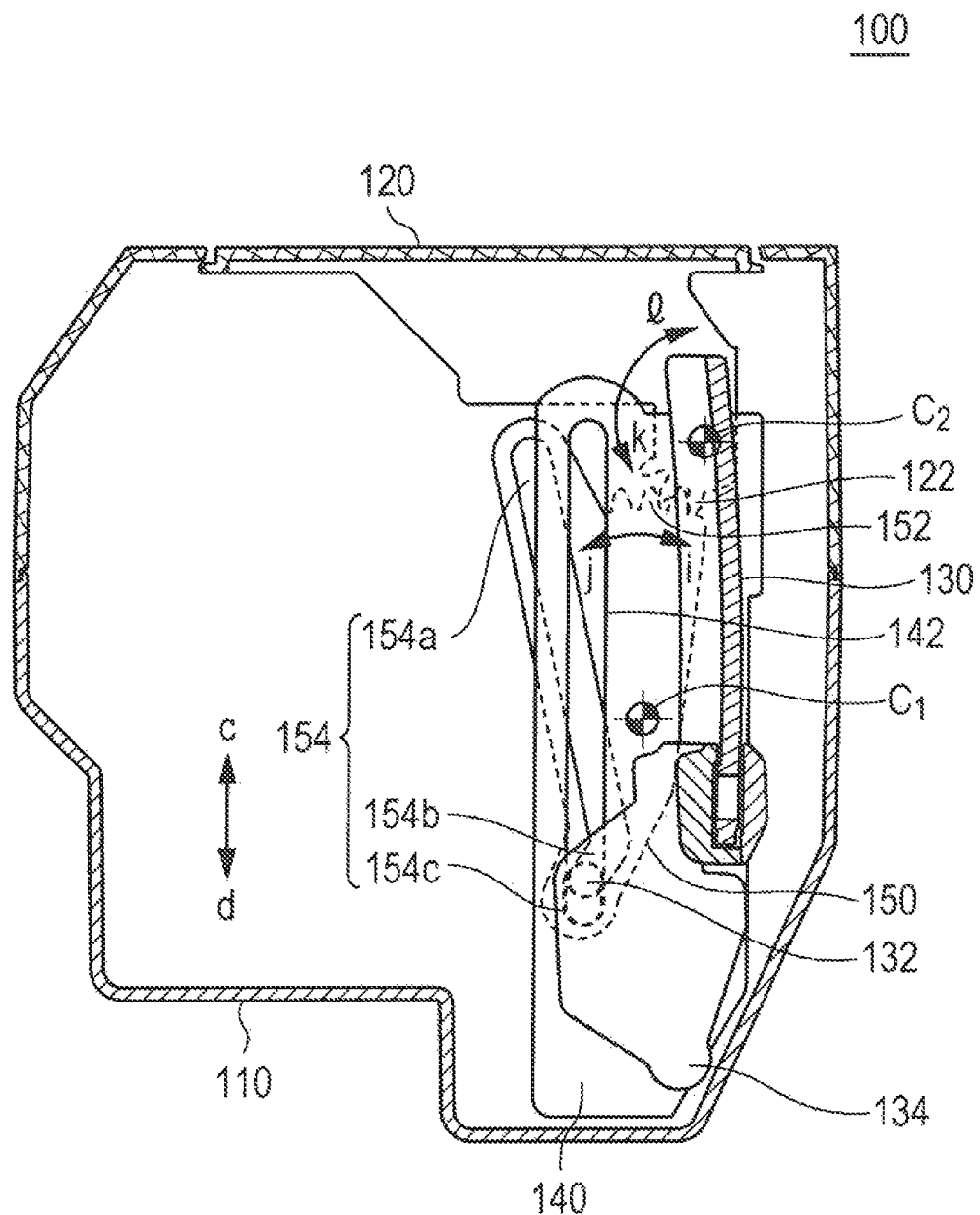
FIG. 6 is a cross-sectional view taken along line VI-VI in FIG. 1.
Figure 8:
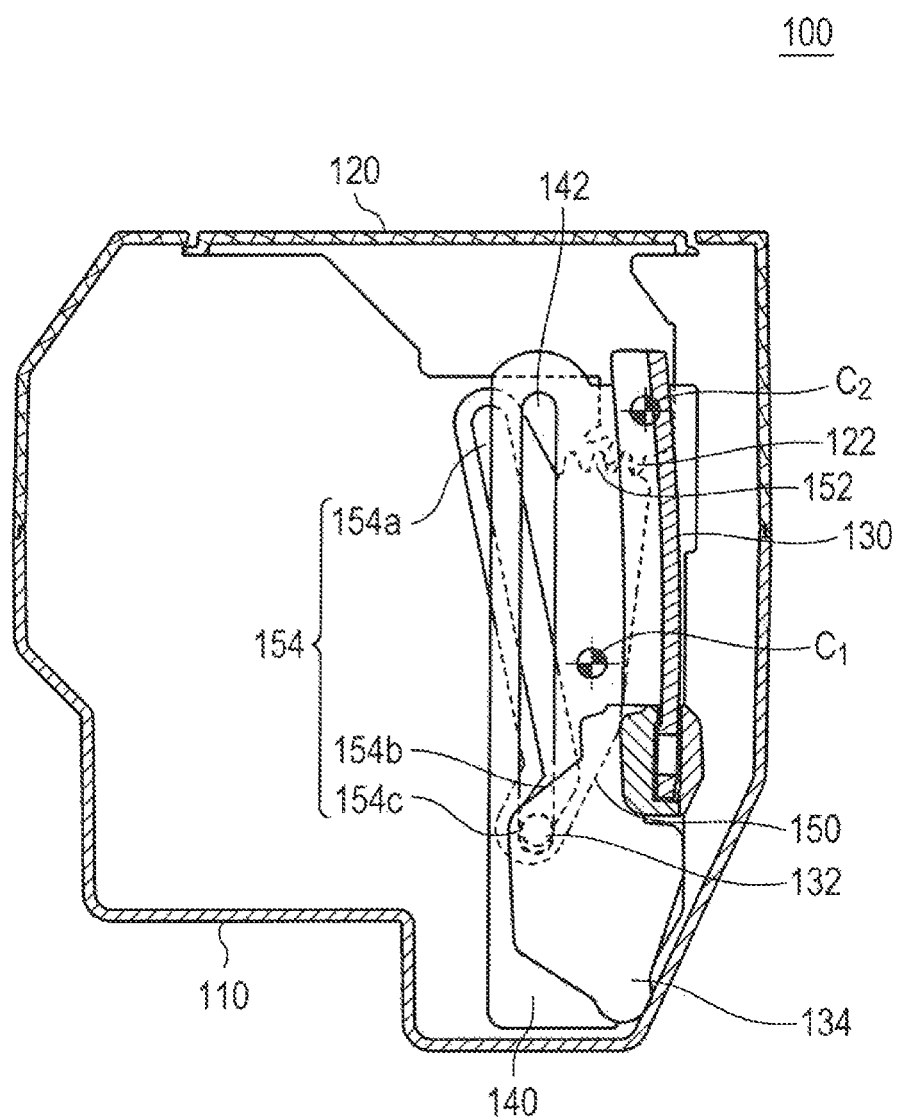
FIG. 8 is a cross-sectional view of the HUD device taken along line VIII-VIII in FIG. 1 when the cover of the HUD device is in a locked state.

With reference to FIG. 5, FIG. 6, and FIG. 8, lifting and lowering operations of combiner 130 will be described. FIG. 5 is a cross-sectional view of HUD device 100 taken along line V-V when combiner 130 is in the raised state. FIG. 6 is a cross-sectional view of HUD device 100 taken along line VI-VI when combiner 130 is in the stored state. FIG. 8 is a cross-sectional view of HUD device 100 taken along line VIII-VIII when combiner 130 is in a locked state.

In the state where combiner 130 is raised as illustrated in FIG. 5, combiner support 134 is moved toward the bottom of housing 110 (in the direction indicated by arrow "d") by driving of the electric motor. In accordance with this movement, combiner 130 fixed to combiner support 134 also moves toward the bottom of housing 110.

Moreover, in accordance with this movement, protrusion 132 of combiner support 134 moves downward from the upper end of slit 142. Protrusion 132 is capable of moving downward till reaching the lower end of slit 142 (the state illustrated in FIG. 8). When protrusion 132 reaches the lower end of second guide portion 154b, combiner 130 turns into the stored state as illustrated in FIG. 6. When protrusion 132 moves downward more and reaches the lower end of slit 142, combiner 130 turns into the locked state as illustrated in FIG. 8.

In the state where combiner 130 is stored as illustrated in FIG. 8, combiner support 134 is moved toward the top of housing 110 (in the direction indicated by arrow "c") by driving of the electric motor. In accordance with this movement, combiner 130 fixed to combiner support 134 also moves toward the top of housing 110.

Moreover, in accordance with this movement, protrusion 132 of combiner support 134 moves upward from the lower end of slit 142. Protrusion 132 is capable of moving upward till reaching the upper end of slit 142 (the state illustrated in FIG. 5). When protrusion 132 reaches the upper end of slit 142, combiner 130 turns into the raised state as illustrated in FIG. 5.

In the state where combiner 130 is raised as illustrated in FIG. 5, protrusion 132 is positioned at the upper end of slit 142. In this raised state, the user can see the image projected on projection surface 130a.

As described above, when combiner 130 switches between the stored state (including the locked state) and the raised state, each protrusion 132 slides upward and downward along slit 142. This causes combiner 130 supported by combiner support 134 to perform the lifting and lowering operations in the direction indicated by arrow "c" or arrow "d". Accordingly, the storage function of combiner 130 can be achieved.

[Opening and Closing Operations of Cover 120]

Figure 7:
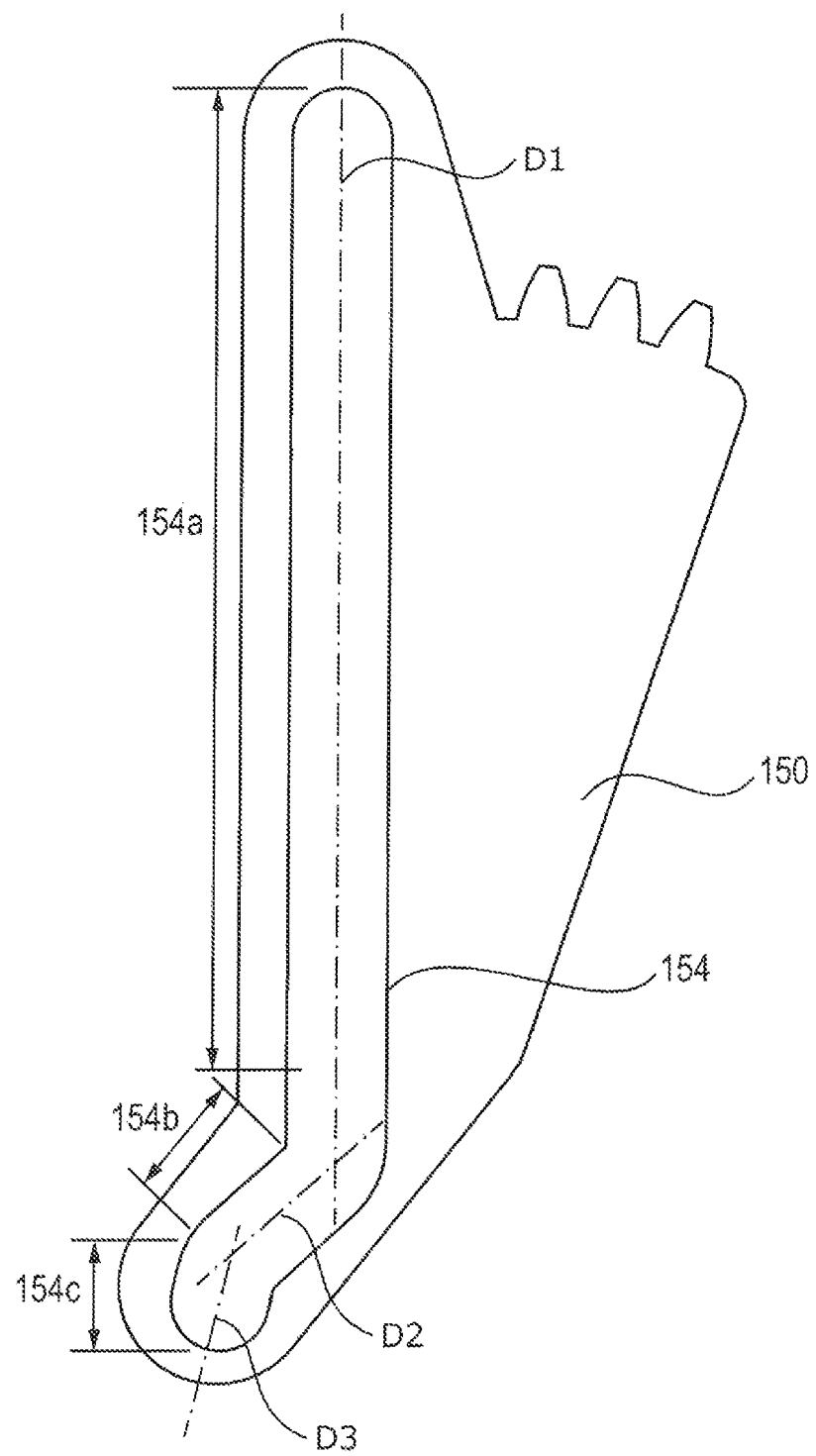
FIG. 7 illustrates a cover-operation member of the HUD device illustrated in FIG. 1.

Next, with reference to FIG. 4 to FIG. 8, the details of the opening and closing operations of cover 120 will be described. FIG. 7 illustrates cover-operation member 150. FIG. 8 is a cross-sectional view of HUD device 100 taken along line VIII-VIII when cover 120 is in the locked state. Note that FIG. 7 simplifies cover-operation member 150 where through hole 155, oval hole 156 (see FIG. 12 and FIG. 13) and the like are omitted.

As illustrated in FIG. 4, cover-operation members 150 are plate-shaped members disposed on the left side and right side of housing 110, respectively, on the outer sides of lifting supports 140. In other words, cover-operation members 150 are disposed on both sides of combiner support 134, and open and close cover 120 in conjunction with the lifting and lowering operations of combiner 130. Specifically, first boss 143 (protrusion) of lifting support 140 is inserted into through hole 155 of cover-operation member 150, and second boss 144 of lifting support 140 is loosely fitted into oval hole 156 of cover-operation member 150 (see FIG. 12). In other words, cover-operation member 150 is attached to lifting support 140 so as to be turnable about first boss 143. As illustrated in FIG. 5 and FIG. 6, cover 120 includes first gear portions 122. First gear portions 122 are fixedly provided to cover 120.

Cover-operation member 150 includes through hole 155 into which rotary shaft $C_1$ is inserted, second gear portion 152, and guide portion 154. The rotation axis of rotary shaft $C_1$ is fixed so as to pass through housing 110 in the lateral (horizontal) direction. Cover-operation member 150 turns about rotary shaft $C_1$. Here, first boss 143 inserted into through hole 155 of cover-operation member 150 serves as rotary shaft $C_1$.

Figure 13:
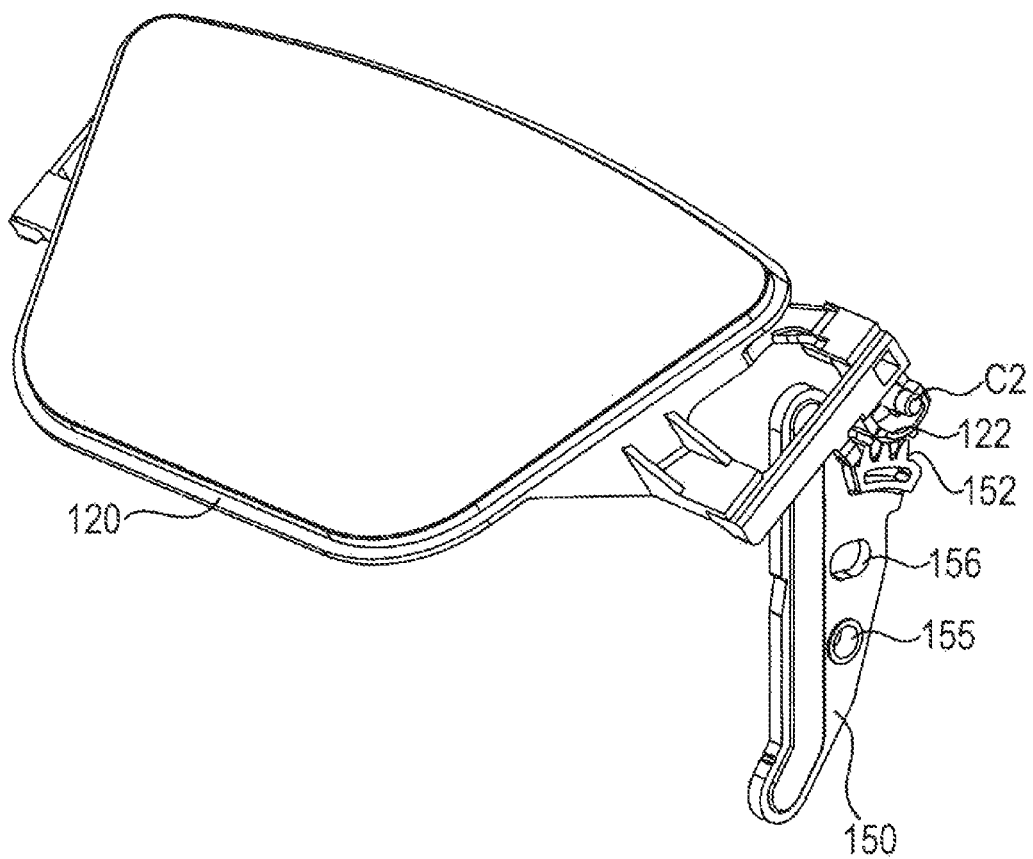
FIG. 13 is a perspective view showing an attachment state of the cover and the cover-operation member of the HUD device illustrated in FIG. 1.

Second gear portion 152 is fixedly provided to the main body of cover-operation member 150 and meshes with first gear portion 122 (see FIG. 13). When cover-operation member 150 is turned, second gear portion 152 and first gear portion 122 convey the rotary movement and causes cover 120 to turn. In other words, in accordance with the turn of cover-operation members 150, cover 120 also turns. Cover 120 turns about gear shaft $C_2$ of first gear portion 122 in the direction opposite to the direction in which cover-operation member 150 turns.

Guide portion 154 substantially extends vertically. In other words, guide portion 154 is bent in the meandering shape, but is not bent in a U-shape at a steep angle. Protrusion 132 of combiner support 134 is inserted into guide portion 154. Protrusion 132 of combiner support 134 is also inserted into guide portion 154 through slit 142.

Guide portion 154 includes first guide portion 154a, second guide portion 154b, and third guide portion 154c. The upper end of second guide portion 154b is connected to first guide portion 154a, and the lower end of second guide portion 154b is connected to third guide portion 154c. Here, direction D2 in which second guide portion 154b extends (hereinafter, referred to as "second direction D2") is different from direction D1 in which first guide portion 154a extends (hereinafter, referred to as "first direction D1").

When combiner support 134 is moved in a downward direction of housing 110 (in the direction indicated by arrow "d") by driving of the electric motor in the state where combiner 130 is raised as illustrated in FIG. 5, protrusion 132 positioned at the upper end of slit 142 of HUD device 100 also moves downward. When protrusion 132 moves within slit 142 in a downward direction of housing 110, protrusion 132 simultaneously slides within guide portion 154 of cover-operation member 150.

First guide portion 154a is disposed in cover-operation member 150 in such a manner that the position and the shape of first guide portion 154a correspond to the position and the shape of slit 142 when protrusion 132 moves along first guide portion 154a. In other words, first guide portion 154a extends in the direction parallel to the lifting and lowering directions of combiner 130 in the first state (the state where HUD device 100 is used). Accordingly, when protrusion 132 moves along first guide portion 154a, the turn of cover-operation member 150 in the direction indicated by arrow "i" or arrow "j" (see FIG. 6) is restricted. Therefore, it is possible to fix the position of cover 120 including first gear portion 122 that meshes with second gear portion 152 of cover-operation member 150 to an opened state.

After protrusion 132 reaches the upper end of second guide portion 154b which is connected to first guide portion 154a, and when combiner support 134 is moved in a downward direction of housing 110 (in the direction indicated by arrow "d") by driving of the electric motor, protrusion 132 moves downward within second guide portion 154b. Since second guide portion 154b extends in second direction D2 different from first direction D1, as illustrated in FIG. 5 and FIG. 6, cover-operation member 150 turns about rotary shaft $C_1$ in the direction indicated by arrow "j" in accordance with the movement of protrusion 132. Moreover, in accordance with the upward movement of protrusion 132 within second guide portion 154b (in the direction indicated by arrow "c"), cover-operation member 150 turns about rotary shaft $C_1$ in the direction indicated by arrow "i".

In accordance with the turn of cover-operation member 150 in the direction indicated by arrow "i" or arrow "j", first gear portion 122 of cover 120 which meshes with second gear portion 152 of cover-operation member 150 turns about rotary shaft $C_2$ (gear axis of first gear portion 122) in the direction indicated by arrow "k" or arrow "l" (see FIG. 6). In other words, cover 120 opens and closes in accordance with the turn of cover-operation member 150. Specifically, when first gear portion 122 rotates in the direction indicated by arrow "k", cover 120 which is in the closed state turns in the direction indicated by arrow "n" (see FIG. 5) and turns into an opened state. Accordingly, as illustrated in FIG. 5, opening 111a is formed in the moving direction of combiner 130, allowing combiner 130 to protrude through opening 111a of housing 110. On the other hand, when first gear portion 122 rotates in the direction indicated by arrow "l", cover 120 which is in an opened state turns in the direction indicated by arrow "m" illustrated in FIG. 5, and turns into the closed state. Accordingly, as illustrated in FIG. 6, opening 111a illustrated in FIG. 5 disappears, making combiner 130 accommodated in housing 110 invisible from outside of housing 110.

Accordingly, cover-operation member 150 is disposed such that direction D2 (second direction D2) in which second guide portion 154b which is at least a portion of guide portion 154 extends and the direction in which slit 142 extends are different from each other. In one example, direction D2 in which second guide portion 154b extends is determined according to the speed of the opening and closing operations of cover 120. Moreover, in one example, the length of second guide portion 154b in direction D2 in which second guide portion 154b extends is determined according to the turn range of cover-operation member 150 in the direction indicated by arrow "i" or arrow "j". Specifically, the length of second guide portion 154b in direction D2 in which second guide portion 154b extends is determined such that the protrusion is positioned at the upper end of second guide portion 154b when cover 120 starts to be switched from the opened state to the closed state, and that protrusion 132 is positioned at the lower end of second guide portion 154b when cover 120 is in the closed state.

In this way, in HUD device 100, it is possible to perform the opening and closing operations of cover 120 in conjunction with the lifting and lowering operations of combiner 130 made by protrusions 132. This allows the lifting and lowering operations of combiner 130 and the opening and closing operations of cover 120 to be performed by using one electric motor. Therefore, HUD device 100 does not require a driving mechanism for performing the opening and closing operations of cover 120 separately from the lifting and lowering operations of combiner 130, leading to a compact configuration of HUD device 100.

After protrusion 132 reaches the lower end of second guide portion 154b which is connected to third guide portion 154c, and when combiner support 134 is moved in a downward direction of housing 110 (in the direction indicated by arrow "d") by driving of the electric motor, protrusion 132 moves downward within third guide portion 154c. As a result, as illustrated in FIG. 8, protrusion 132 makes contact with the inner side surface of slit 142 and the inner side surface of third guide portion 154c.

Figure 9:
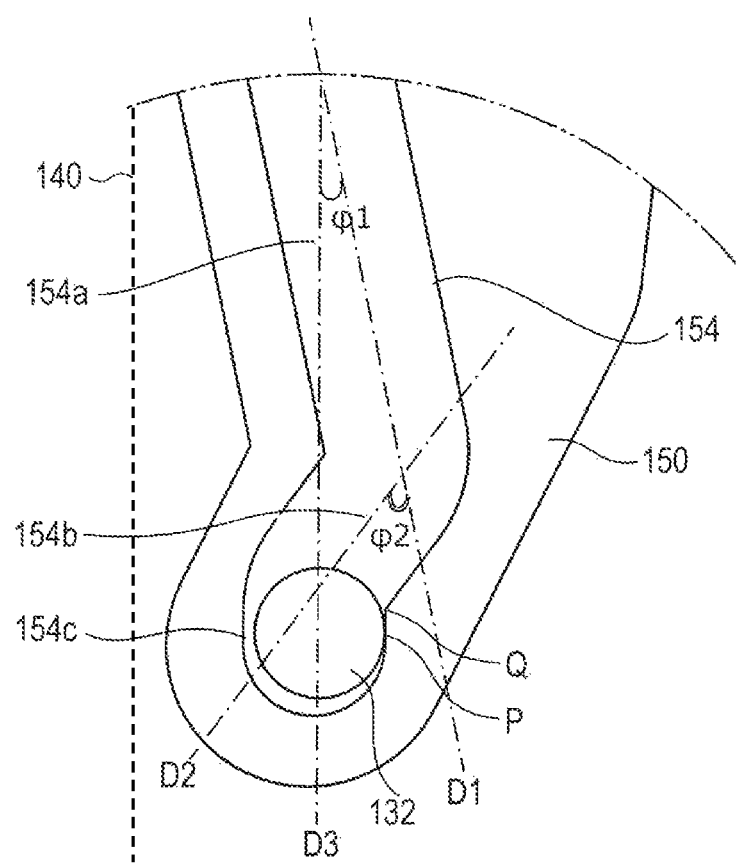
FIG. 9 illustrates an example of a third guide portion in the cover-operation member illustrated in FIG. 7.
Figure 10:
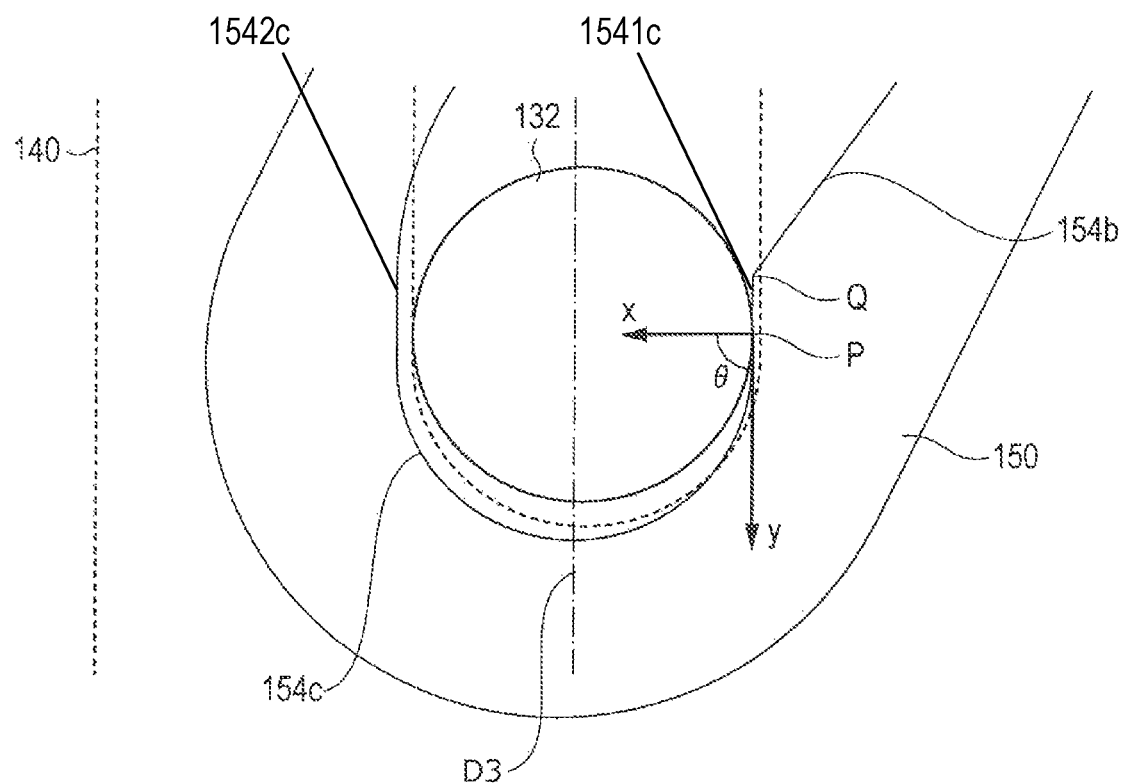
FIG. 10 is an enlarged view showing the third guide portion illustrated in FIG. 9 and the surrounding region.

FIG. 9 illustrates an example of third guide portion 154c. FIG. 10 is an enlarged view of protrusion 132 illustrated in FIG. 9 and the surrounding region. In FIG. 9 and FIG. 10, lifting support 140 is indicated by broken lines, and cover-operation member 150 is indicated by solid lines.

As illustrated in FIG. 9, third guide portion 154c extends in third direction D3 which is different from direction D2 in which second guide portion 154b extends (second direction D2). Third guide portion 154c has a shape in which the component of the force applied to protrusion 132 in the lifting and lowering directions is downward or zero when cover 120 is pressed in the second state where HUD device 100 is not used. Specifically, angle φ2 formed by first direction D1 and third direction D3 is less than angle φ1 formed by first direction D1 and second direction D2. In other words, the direction in which third guide portion 154c is bent with respect to second guide portion 154b is opposite to the direction in which second guide portion 154b is bent with respect to first guide portion 154a.

In one example, the inner side surface of third guide portion 154c has a region parallel to the inner side surface of slit 142. For example, the radius of protrusion 132 is 3 mm, and the distance between contact point P at which protrusion 132 and third guide portion 154c is in contact with each other and upper end Q of the region of the inner side surface of third guide portion 154c parallel to the inner side surface of slit 142 is 2 mm.

Figure 11:
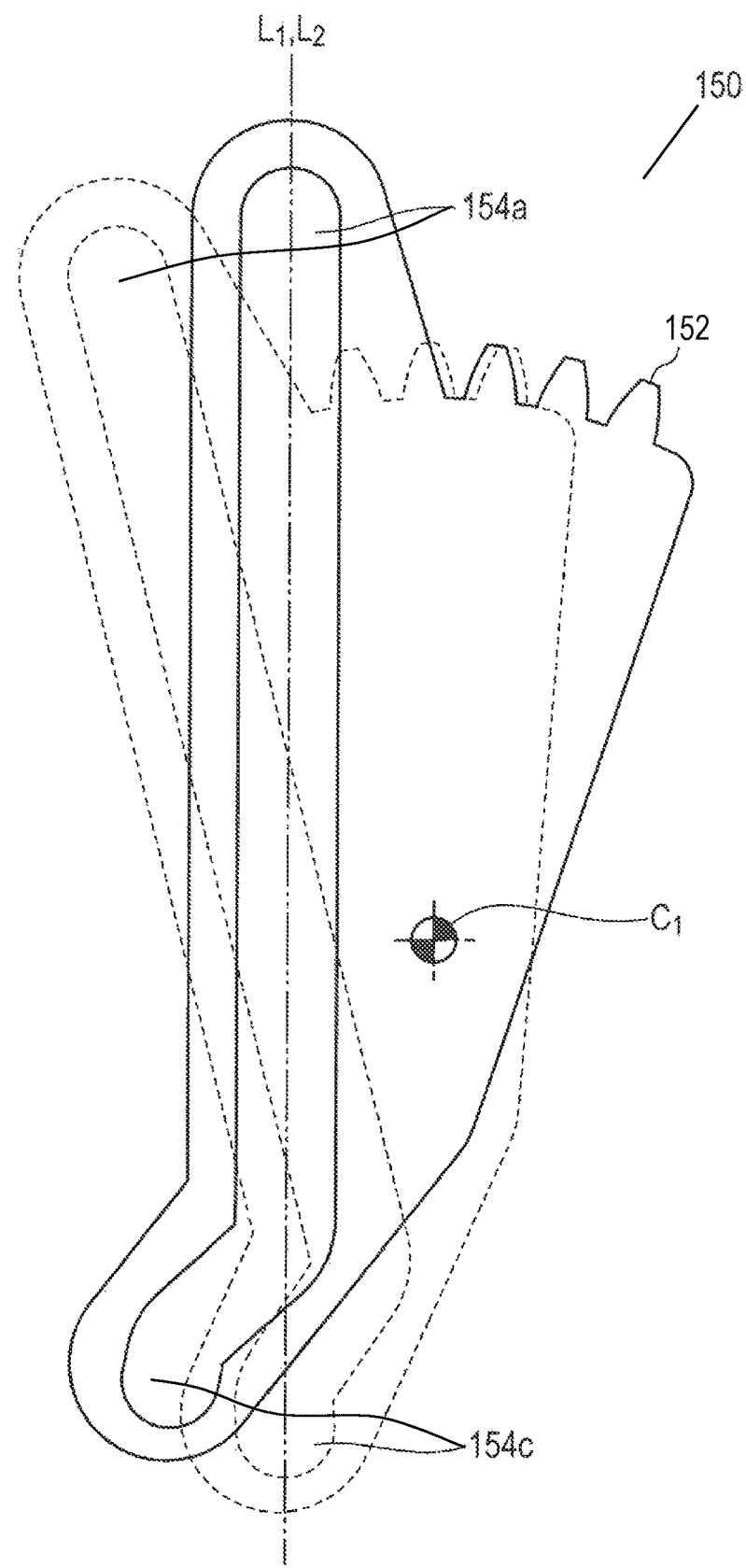
FIG. 11 illustrates a first turn position and a second turn position of the cover support illustrated in FIG. 7.

In one example, third guide portion 154c has first side surface 1541c and second side surface 1542c which are parallel to third direction D3. First side surface 1541c is closer to rotary shaft $C_1$ and second side surface 1542c is farther from rotary shaft $C_1$ than first side surface 1541c is. Angle θ is 90 degrees. Angle θ is formed by normal direction "x" at contact point P where protrusion 132 makes contact with first side surface 1541c and direction "y". In direction "y", protrusion 132 slides within slit 142 when combiner 130 is stored. In other words, third direction D3 is parallel to the lifting and lowering directions in the second state. When protrusion 132 slides within third guide portion 154c, as illustrated in FIG. 11, central axis L1 of slit 142 of lifting support 140 matches central axis L2 of third guide portion 154c of cover-operation member 150. In this case, the inner side surface of slit 142 with which protrusion 132 makes contact and the inner side surface of third guide portion 154c with which protrusion 132 makes contact are parallel to each other.

When cover 120 is pressed in this state, the driving force is applied to cover-operation member 150 via first gear portion 122 and second gear portion 152, such that cover-operation member 150 turns about rotary shaft $C_1$ in direction "i" illustrated in FIG. 6. As a result, on the inner side surface of third guide portion 154c with which protrusion 132 makes contact, the force in the normal direction of the inner side surface is applied to protrusion 132. Then, protrusion 132, which is sandwiched between the inner surface of slit 142 and the inner surface of third guide portion 154c which are parallel to each other, comes to rest. In other words, the component of the force applied to protrusion 132 in the lifting or lowering direction is zero. As a result, the turn of cover-operation member 150 is prevented. When the turn of cover-operation member 150 is prevented, opening of cover 120 is also prevented, causing cover 120 to turn into the locked state.

Angle θ is formed by normal direction "x" at contact point P and direction "y" in which protrusion 132 slides within slit 142 when combiner 130 is stored. Protrusion 132 is in contact with the side surface, of the side surfaces of third guide portion 154c, closer to the rotation axis of rotary shaft $C_1$, at contact point P. Angle θ may be less than 90 degrees. In other words, third direction D3 may be the direction in which, in the second state, third guide portion 154c is inclined toward rotary shaft $C_1$ from the connection point between third guide portion 154c and second guide portion 154b. In further other words, third direction D3 may be toward rotary shaft $C_1$. In this case, for example, an end of third guide portion 154c is closed, and the inner side surfaces of third guide portion 154c are parallel to each other. The length of the parallel side surfaces is, for example, 2 mm.

When cover 120 is pressed in this state, on the inner side surface of third guide portion 154c, with which protrusion 132 is in contact, the force in the normal direction of the inner side surface is applied to protrusion 132. However, protrusion 132 does not move upward, but attempts to move downward. In other words, the component of the force applied to protrusion 132 in the lifting and lowering directions is downward. However, since guide portion 154 prevents downward movement of protrusion 132, protrusion 132 does not move any further. As a result, cover-operation member 150 is prevented from turning. When the turn of cover-operation member 150 is prevented, cover 120 is also prevented from opening, causing cover 120 to turn into the locked state.

As described above, in the present disclosure, it is possible to achieve the locked state of cover 120 without holding with the electromagnetic force of the motor by providing third guide portion 154c having the above-described specific shape in guide portion 154.

Other Embodiments

With reference to FIG. 5 and FIG. 6, the case has been described where cover 120 includes first gear portions 122 and cover-operation members 150 includes second gear portions 152. However, the present disclosure is not limited to such a configuration. It is sufficient that cover 120 opens and closes in accordance with the turn of cover-operation members 150.

Moreover, for example, the configuration of lifting supports 140 is not limited to the configuration described in the above embodiment, as long as lifting supports 140 can support combiner support 134 so that combiner support 134 can be lifted and lowered.

In the above embodiment, it has been described that cover-operation member 150 turns with first boss 143 (protrusion) of lifting support 140 which is inserted into through hole 155 of cover-operation member 150 serving as rotary shaft $C_1$. In other words, in this case, lifting support 140 includes first boss 143 which is a protrusion which turnably supports cover-operation member 150. However, the configuration of rotary shaft $C_1$ of cover-operation member 150 is not limited to such a configuration. For example, it may be that a protrusion is disposed in cover-operation member 150 and a recess (including a hole) is disposed in lifting support 140 so that the protrusion and the recess can be engaged with each other.

The present disclosure is applicable to an HUD device which lifts and lowers the combiner.

What is claimed is:

1. A head-up display device comprising:
    a housing having an opening on a top of the housing;
    a cover which is accommodated in the housing and opens the opening in a first state, and closes the opening in a second state;
    a combiner which comes out from the opening in the first state, and is accommodated in the housing in the second state;
    a combiner support which supports the combiner;
    a lifting support which supports the combiner support so that the combiner support can be lifted and lowered; and
    a pair of cover-operation members which is disposed on opposite sides of the combiner support, and opens and closes the cover in accordance with a lifting operation and a lowering operation of the combiner,
    wherein the combiner support includes a pair of protrusions disposed on the opposite sides of the combiner support,
    each of the pair of cover-operation members includes a guide portion which extends vertically,
    the pair of protrusions moves along the guide portions, respectively, in accordance with the lifting operation of the combiner, causing the pair of cover-operation members to turn about a rotary axis in a direction in which the cover is opened, and the pair of protrusions moves along the guide portions, respectively, in accordance with the lowering operation of the combiner, causing the pair of cover-operation members to turn about the rotary axis in a direction in which the cover is closed,
    each of the guide portions includes, from top in order:
    a first guide portion which extends along a first direction in the first state, and engages with one of the pair of protrusions in the first state, the first direction being parallel to lifting and lowering directions in which the combiner is lifted and lowered;
    a second guide portion which is connected to the first guide portion, extends along a second direction different from the first direction, and engages with the one of the pair of protrusions when the pair of cover-operation members turns; and
    a third guide portion which is connected to the second guide portion, extends along a third direction different from the second direction, and engages with the one of the pair of protrusions in the second state, and
    an angle formed by the first direction and the third direction is less than an angle formed by the first direction and the second direction.

2. The head-up display device according to claim 1,
wherein the third direction is parallel to the lifting and lowering directions in the second state.

3. The head-up display device according to claim 2,
wherein the third guide portion includes a first side surface and a second side surface which are parallel to the third direction, the first side surface being closer to the rotary axis, the second side surface being farther from the rotary axis than the first side surface is, and a normal direction and each of the lifting and lowering directions form an angle of 90 degrees or less in the second state, the normal direction extending from a contact point where the first side surface contacts the one of the pair of protrusions.

4. The head-up display device according to claim 1,
wherein the cover includes a first gear portion,
each of the pair of cover-operation members includes a second gear portion which meshes with the first gear portion, and the cover turns about a gear axis of the first gear portion in a direction opposite to a direction in which the pair of cover-operation members turn.

5. The head-up display device according to claim 1,
wherein the lifting support includes a pair of plate-shaped members each provided with a slit which extends linearly and vertically, each of the pair of plate-shaped members engaging with a corresponding one of the pair of protrusions at the slit, the pair of cover-operation members are respectively disposed on outer sides of the pair of plate-shaped members, and each of the pair of protrusions penetrates a corresponding one of the slits and engages with a corresponding one of the guide portions.

6. The head-up display device according to claim 5,
wherein the lifting support includes one of a protrusion and a recess which turnably supports the pair of cover-operation members.

\* \* \* \* \*